United States Patent [19]

Tabak

[11] Patent Number: 4,684,888
[45] Date of Patent: Aug. 4, 1987

[54] APPARATUS SUBJECT TO RANDOM ACCELERATIVE MOTION FOR SENSING MOTION OF A MAGNETICALLY SUSCEPTIBLE PART

[75] Inventor: Andrew Tabak, Burlington, Mass.

[73] Assignee: RCA Corporation, Princeton, N.J.

[21] Appl. No.: 696,747

[22] Filed: Jan. 31, 1985

[51] Int. Cl.[4] ............... G01B 7/14; G01N 27/72; G01R 33/00; H01L 41/04
[52] U.S. Cl. ............... 324/207; 324/225; 310/328
[58] Field of Search ............... 324/207, 208, 225; 310/328, 357, 366, 331

[56] References Cited

U.S. PATENT DOCUMENTS

| | | | |
|---|---|---|---|
| 3,221,213 | 11/1965 | McKinney | 315/209 T |
| 3,750,010 | 7/1973 | Abnett et al. | 324/225 |
| 3,988,620 | 10/1976 | McDavid | 310/328 |
| 4,409,548 | 10/1983 | Focht | 324/168 |

Primary Examiner—Reinhard J. Eisenzopf
Assistant Examiner—Walter E. Snow
Attorney, Agent, or Firm—Allen E. Amgott; Raymond E. Smiley; Joseph S. Tripoli

[57] ABSTRACT

A magnetically susceptible part motion sensor where the sensor is subject to random accelerative conditions. The sensor comprises a first accelerometer and magnet combination and a second accelerometer and nonmagnetic body combination. The accelerometers are substantially identical and the nonmagnetic body is substantially identical in weight, size and other characteristics to the magnet. Therefore the signal produced by the accelerometers due to random accelerative motion are identical but the first accelerometer produces a signal component corresponding to the passage of the magnetically susceptible part. A differential amplifier is connected to receive the outputs of the two accelerometers and to produce an output signal corresponding substantially only to the passage of the magnetically susceptible part.

6 Claims, 6 Drawing Figures

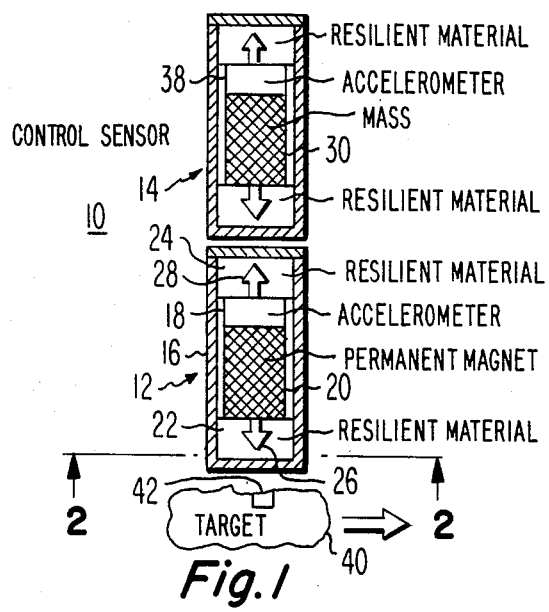
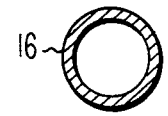
Fig.1
Fig.2
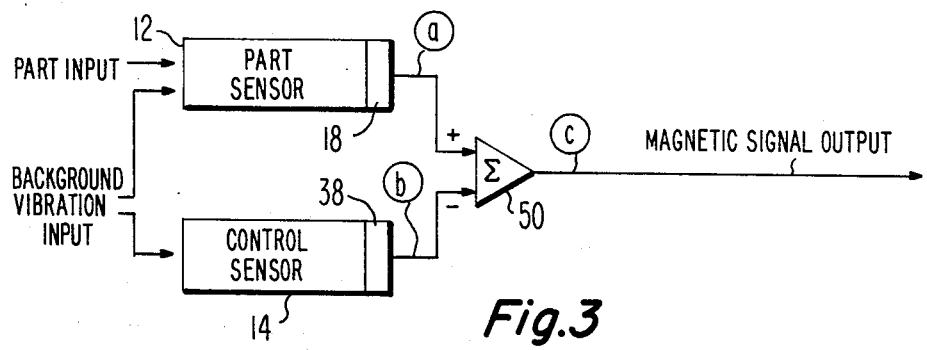
Fig.3
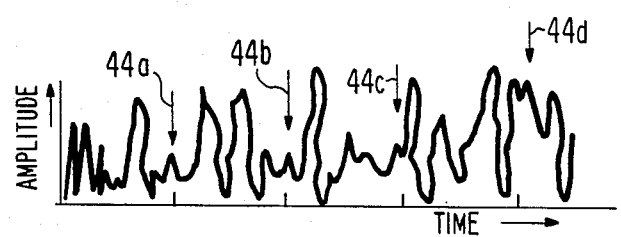
Fig.4a
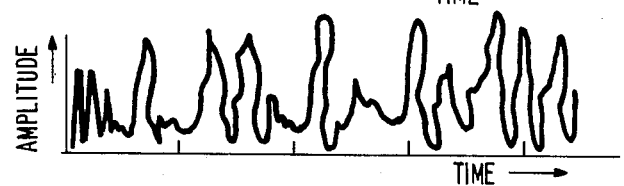
Fig.4b
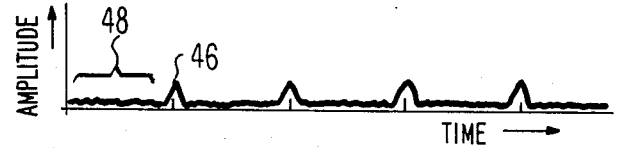
Fig.4c 4,684,888

1

APPARATUS SUBJECT TO RANDOM ACCELERATIVE MOTION FOR SENSING MOTION OF A MAGNETICALLY SUSCEPTIBLE PART

The Government has rights to this invention pursuant to Contract No. DAAE07-83-C-R112 awarded by the Department of the Army.

BACKGROUND OF THE INVENTION

1. Field of the Invention

This invention is concerned with motion sensors for moving magnetically susceptible parts and more particularly with such sensors for detecting motion of magnetically susceptible parts under nonuniform accelerative conditions of the sensor and part.

2. Description of the Prior Art

It is known to use a piezoelectric transducer combined with a magnet to detect motion of the magnetically susceptible part relative to the transducer-magnet combination. Examples of such apparatus are illustrated in U.S. Pat. No. 4,409,548 issued Oct. 11, 1983 to L. R. Focht and U.S. Pat. No. 3,221,213 issued Nov. 30, 1965 to J. R. McKinney. Such magnetically susceptible part motion sensors are satisfactory if the signal produced by the transducer when the part passes the magnet is substantially greater then any noise signal produced by the transducer. Such noise signals are present, for example, when the transducer is bounced around by motion of a vehicle in which the transducer is resident.

In the case of the aforementioned patents, because the magnet can be placed very close to the part, the signal produced by the transducer as the part passes the magnet is far in excess of noise generated due to bouncing. In some situations the magnet and moving magnetically susceptible part can not be placed close together and/or the size of the transducing element is very small such that using the structure of the aforementioned patents the noise signal is in excess of the signals due to motion of the part to be sensed.

U.S. Pat. No. 3,988,620 issued Oct. 26, 1976 to W. T. McDavid is concerned with a pressure-sensitive transducer used for marine seismic exploration systems. There, two transducers are mechanically mated together and electrically connected to cancel the effects of the accelleration through the water. There is no magnet in the structure of U.S. Pat. No. 3,998,620 and the arrangement is in no way suitable for measuring motion of a magnetically susceptible part.

SUMMARY OF THE INVENTION

In accordance with a preferred embodiment of the present invention, apparatus for measuring motion of a magnetically susceptible part, where the part and apparatus are subject to random accelerative motions, comprises in combination, a first accelerometer, a magnet physically arranged with the first accelerometer such that as the magnetically susceptible part passes in proximity to the magnetic part, the accelerometer produces a corresponding signal but also produces signal components corresponding to the random accelerative conditions to which the apparatus is subject, a second accelerometer, a material identical in size, shape and weight to the magnet but devoid of magnetic properties and physically arranged with a second accelerometer as the magnet is arranged with the first accelerometer so the second accelerometer produces said signal components.

A means is receptive to the signals from said first and second accelerometers for subtracting one accelerometer signal from the other to produce a signal substantially corresponding only to the passage of said magnetically susceptible part in proximity to said magnet.

BRIEF DESCRIPTION OF THE DRAWING

FIG. 1 a motion sensing apparatus in accordance with a preferred embodiment of the present invention illustrated with a sensor case cut away;

FIG. 2 an end cross section view of the sensor in FIG. 1 along lines 2—2 thereof;

FIG. 3 is a schematic in electrical block diagram form illustrating the electrical interconnection of the inventive apparatus; and FIGS. 4a, 4b and 4c are waveforms useful in understanding the operation of the invention

DETAILED DESCRIPTION OF THE INVENTION

Referring now to FIG. 1, the mechanical and transducer parts of a magnetically susceptible part motion sensor assembly 10 in accordance with invention are illustrated. The sensor assembly comprises two sensors, the actual magnetically susceptible part motion sensor 12 and a control sensor 14.

Referring first to sensor 12, all parts are housed in a nonmagnetic barrel-like cylindrical container 16 illustrated in end view in FIG. 2 and in cross section in FIG. 1. Container 16 is typically made of a rigid material chosen to minimize the transmission of all forms of energy except that of magnetic phenomenon. The specific shape is not critical, however, motion of internal components should be restricted to a single axis of motion. Within container 16 is an accelerometer 18 to which is attached, on one end, a permanent magnet 20. Accelerometer 18 is typically a piezoelectric crystal material having minimal mass thereby maximizing the ratio of the flux-to-mass of the magnet-accelerometer assembly.

Magnet 20 is typically an Alnico V magnet. The magnet and accelerometer assembly is suspended between two resilient holders which have spring constants and dampening coefficients which enhance the measurement of the desired spectrum limits. The magnet and accelerometer are shaped to fit in container 16. The magnet and accelerometer are positioned between two pieces of resilient material 22 and 24 respectively which are, in turn, secured to either end of container 16. Thus as assembly 10 is bounced around, movement back and forth of accelerometer 18 and magnet 20 occurs in the direction of arrows 26 and 28 thus allowing for single axial motion of the accelerometer 18 and magnet 20 combination.

Sensor 14 is identical to sensor 12 in all respects but one. A mechanical version of a medical placebo (hereinafter placebo) 30 replaces magnet 20. Placebo 30 is identical in size, shape and weight to magnet 20 but is nonmagnetic. In particular, accelerometer 38 is identical to accelerometer 30 to produce an identical signal output when the two accelerometers are subject to identical compressive forces. Sensors 14 and 16 are secured end to end as illustrated in FIG. 1. The slight separation between the sensors is for illustration purposes only.

Magnet 20 is positioned as near as practical to a moving target 40 which could be any device including one or more magnetically susceptible material parts 42. An example is a tank tread in which the various tread elements themselves are made of rubber but are secured together by steel pins. Alternatively target 40 can be any other moving apparatus which from time to time moves by sensor assembly 10 and includes magnetically susceptible parts.

Referring now to FIG. 3, the electrical interconnection of the sensor assembly is illustrated. The outputs of accelerometers 18 and 38 of sensors 12 and 14 respectively are connected to inputs of a differential amplifier 50. The output of the differential output 50 provides a signal indicative of passage of the magnetically susceptible part 42 of target 40 (FIG. 1) past magnet 20.

The encircled letters a, b, and c in FIG. 3 relate to waveforms 4a, 4b and 4c respectfully which illustrate the signal produced at points a, b, and c respectfully in FIG. 3.

Operation of sensor assembly 10 in FIG. 1 is as follows. With reference to FIG. 1 it will be assummed that sensor assembly 10 is mechanically attached to a vehicle or other object (not shown) containing in target 40. Target 40 is assumed to include a magnetically susceptible part 42 which from time to time passes in proximity to magnet 20. It will be further assummed that the vehicle or object and thus sensor assembly 10 is subject to random accelerative conditions generally referred to as bouncing around.

As such, ignoring for the moment the effects of target 40 on accelerometer 18, magnet 20 and placebo 30 move substantially identically back and forth in directions indicated by arrows 24 and 26, causing substantially identical electrical signals to be produced by accelerometers 18 and 38 respectfully. The signals are substracted by differential amplifier 50, FIG. 3, so the output of amplifier 50 is essentially zero. In practice the outputs of accelerometers 18 and 38 will not likely be identical so that some output will occur from summation amplifier 50 but it will be below that produced as a result of passage of part 42 to be described hereinafter.

Now, considering the presence of target 40 and in particular part 42 thereof, as the magnetically susceptible part 42 approaches magnet 20, the magnet and accelerometer 18 tend to move toward part 42 in the direction of arrow 26 then as the part passes beyond magnet 20 the magnet and accelerometer move away from part 42 in direction of arrow 28, causing the accelerometer, as a result of this motion, to produce signal components related to the passage of magnetically susceptible part 42 in target 40. This signal component identified by vertical arrows 44 (there being four such arrows legended 44a, 44b, 44c and 44d to indicate four passes of part 42) in FIG. 4a is not present in the signal from accelerometer 38 and is therefore present in the signal from the differential amplifier 50 as illustrated in waveform, FIG. 4c.

It will be noted from FIG 4c that the pulses such as 46 due to the passage of magnetically susceptible part 42 (FIG. 1) past sensor 10 are far greater in amplitude than the background noise signal component illustrated for example by waveform portion 48. This is so even though in the actual signal produced by accelerometer 18, as illustrated in FIG. 4a, the signal component due to passage of part 42 is lower in amplitude than the noise signal caused by random accelerative conditions of sensor 10.

The signal produced by differential amplifier 50 may be used for any suitable purpose by apparatus (not shown). For example, in the aforementioned example with the tank and tank tread, the pins therein mentioned are subject to becoming disloged from their normal location on the tread. In that case the purpose of sensor assembly 10 is to determine ultimately the absence of a pin so that corrective action may be taken by a tank mechanic. In that example, circuitry of conventional design (not shown) would determine when pins should be passing sensor assembly 10 and produce warning signals when the pins are missing.

What is claimed is:

1. Apparatus for measuring motion of a magnetically susceptible part where the part and apparatus are subject to random accelerative motion, comprising in combination:

a first accelerometer;

a magnet physically arranged with the accelerometer for movement therewith such that as a magnetically susceptible part passes said magnet, said accelerometer produces a corresponding first signal component and also produces a second signal component corresponding to the random accelerative conditions to which the apparatus is subject, said second signal component being greater in value than said first signal component;

a second accelerometer;

a nonmagnetic body substantially identical in size, shape and weight to said megnet and physically arranged with said second accelerometer as said magnet is arranged with said first accelerometer so said second accelerometer produces said second signal component without producing said first signal component; and means receptive of said first and second signal components from said first accelerometer and second signal component from said second accelerometer for subtracting the one of said first and second accelerometer second signal components from the other of said first and second accelerometer second signal components to produce said first signal component corresponding substantially only to the passage of said magnetically susceptible part past said magnet.

2. The combination as set forth in claim 1 in which said magnet-first accelerometer combination and nonmagnetic body second accelerometer combination are both constrained to motion along a single axis.

3. The combination as set forth in claim 2, further including a nonmagnetic means housing said first and second accelerometers, nonmagnetic body and magnet and wherein there is positioned resilient material at either end.

4. The combination as set forth in claim 1 wherein said first and second accelerometers comprise first and second piezoelectric crystals respectively.

5. The combination asset for claim 1 wherein said accelerometer-magnet combination and accelerometer-nonmagnetic body combination are each constrained to movement substantially only in one axis.

6. The combination as set forth in claim 4 wherein said accelerometer-magnet combination and accelerometer-nonmagnetic body combination are each constrained to movement substantially only in one axis.

* * * * *